United States Patent [19]

Mudder et al.

[11] 4,428,840

[45] Jan. 31, 1984

[54] ANIONIC AND CATIONIC REMOVAL OF COPPER FROM CYANIDE-CONTAINING WASTEWATER

[75] Inventors: Terrance I. Mudder, Piedmont, S. Dak.; Roy G. Neville, Redwood City, Calif.

[73] Assignee: Homestake Mining Company, San Francisco, Calif.

[21] Appl. No.: 389,126

[22] Filed: Jun. 16, 1982

[51] Int. Cl.³ .............................................. C02F 1/62
[52] U.S. Cl. .................................. 210/717; 210/721; 210/726; 210/912
[58] Field of Search ............... 210/912, 904, 719, 721, 210/726, 722, 724, 717

[56] References Cited

U.S. PATENT DOCUMENTS 3,816,306 6/1974 Roy .................................. 210/912 X

Primary Examiner—Thomas G. Wyse
Attorney, Agent, or Firm—Townsend & Townsend

[57] ABSTRACT

A method for removing low concentrations of soluble copper in the form of cupric cation and cuprocyanide and cupricyanide anions comprises first adding ferric cation, or ferrous cation and a soluble oxidizing agent, in an amount in excess of the stoichiometric amount required to form the ferric salts of the cuprocyanide and cupricyanide anions, and after a predetermined time adding an environmentally acceptable soluble precipitant to precipitate substantially all of the remaining excess ferric cation. By this procedure, very small concentrations of soluble cupric cation and the ferric salts of the cuprocyanide and cupricyanide anions, which are typically present in such low concentrations that they remain essentially permanently suspended in colloidal solution, are removed by the insoluble ferric compound which is present in much higher concentrations.

11 Claims, No Drawings

ANIONIC AND CATIONIC REMOVAL OF COPPER FROM CYANIDE-CONTAINING WASTEWATER

BACKGROUND OF THE INVENTION

1. Field of the Invention

The present invention relates generally to the removal of soluble copper from aqueous effluents, and more particularly to a method for removing copper and copper-cyanide complexes from mining wastewater.

In conventional gold extraction techniques, a dilute aqueous solution of sodium cyanide is added to the finely crushed gold ore and the slurry is aerated to dissolve the metallic gold present as soluble aurocyanide ion. The aurocyanide ion is then treated with metallic zinc, which precipitates metallic gold. The remaining aqueous solution must then be treated to remove the extremely toxic cyanide before the solution is discharged to the environment. This may be accomplished by oxidizing the cyanide with hydrogen peroxide in the presence of cationic copper (2-10 ppm). If cationic copper is not added the oxidation of cyanide ion proceeds too slowly to be industrially practicable. While this treatment effectively removes the cyanide to very low concentrations, the residual cationic copper concentration is too high to be environmentally acceptable and must be removed prior to discharge. The copper present in the effluent after removal of the cyanide exists both as the free hydrated copper cation and as a copper-containing anionic complex with the cyanide ion, typically cuprocyanide $[Cu(CN)_4]^{-3}$ and possibly cupricyanide $[Cu(CN)_4]^{-2}$.

Theoretically, both cationic copper and the copper-cyanide complexes may be removed from solution by precipitation since, under certain obtainable conditions, they both form insoluble compounds. In practice, however, the presence of both species at very low concentrations inhibits both the formation of the insoluble compounds and their subsequent precipitation. Specifically, the formation of the insoluble compounds proceeds extremely slowly in the absence of a large excess of the reacting components; and even after the compounds are formed, they are present in such low concentrations that they are very slow to coalesce to form particles large enough to precipitate.

Conventional methods employed in chemistry are not effective when applied to highly dilute solutions, and for this reason ingenious procedures must be sought to remove the last traces of cationic and anionic copper when these species are present in only a few parts per million. It is the purpose of this invention to describe a process for removing extremely minute quantities of both anionic and cationic copper from solution.

2. Description of the Prior Art

U.S. Pat. No. 4,070,281 to Tagashira, et al., discloses the oxidation of cyanide-containing wastewater with cationic copper and an ammonium salt, the process leaving residual soluble cationic copper which must be removed. One method for effecting removal is the addition of ferrous chloride, iron powder or ferrous sulfate to precipitate the copper. U.S. Pat. No. 3,931,007 to Sugano, et al., discloses the addition of hydroxide ion to remove various metals, including copper. However, only incomplete removal of copper is achieved. Patterson, "Wastewater Treatment Technology," Ann Arbor Science Publishers, Inc., Ann Arbor, Mich. (1976), discusses the use of ferrous ion to remove copper under alkaline conditions. Other methods for copper removal are discussed in U.S. Pat. Nos. 3,817,306; 4,054,516; 4,072,605; 4,172,785; and Japanese Patent No. 85,569 and Russian Patent No. 528,265.

SUMMARY OF THE INVENTION

The present invention provides a method for removing very low residual levels of soluble cationic copper and copper-cyanide complexes from wastewater prior to discharge to the environment. The method comprises first adding a solution of a compound containing ferric ion to the waste water in an amount in excess of the stoichiometric quantity required to form the ferric salts of the cuprocyanide and cupricyanide ions. While the ferric salts of these ions are highly insoluble, they are typically present in very low concentrations and require extremely long periods to coalesce and form aggregates of particles of sufficient size to precipitate. Indeed, some solutions will never precipitate these ferric salts, as they will be present as stable colloidal suspensions of identically charged particles which, due to their mutual electrical repulsion, will not coalesce.

The present invention overcomes this problem by providing a second precipitate at a relatively higher concentration, which is able to encapsulate the particles of ferric copper cyanide complexes and neutralize their electrical charges and thus remove the ferric cuprocyanide and ferric cupricyanide. A precipitant is employed which reacts with the excess ferric cation as well as any free cupric cation present to form insoluble ferric and cupric compounds which are able to precipitate. The precipitant is typically an environmentally acceptable, soluble compound having an anion capable of reacting with both the soluble cupric and ferric cations to form insoluble compounds. Preferred precipitants include hydroxides, bicarbonates, carbonates, sulfides, hydrosulfides and the like, ammonium and quaternary hydroxides, or any combinations of these anions.

DESCRIPTION OF THE PREFERRED EMBODIMENT

The present invention is a two-step method for the removal of cupric cation and anionic copper-cyanide complexes to very low and environmentally acceptable final concentrations. The method will find its greatest use as the final or "polishing" stage of a multiple-step process for removing cyanide ion from wastewater, particularly wastewater resulting from cyanide extraction of gold from gold ore.

Cyanide-containing wastes may be treated with hydrogen peroxide in the presence of cationic copper (2-10 ppm) to effect cyanide oxidation to non-toxic cyanate ($OCN^-$) ion. This method is described in U.S. Pat. No. 3,617,567, to Owen Mathre, the disclosure of which is incorporated herein by reference. While such oxidation achieves good and fairly rapid removal of free cyanide ion, concurrently with the oxidation reaction, the unoxidized cyanide rapidly forms complex anions with the copper present, particularly cuprocyanide ion $[Cu(CN)_4]^{-3}$ and cupricyanide ion $[Cu(CN)_4]^{-2}$. Both these anions are highly soluble in the presence of the predominant cations in the water, particularly sodium and potassium and, moreover, these complex copper-containing anions are not rapidly oxidized by the hydrogen peroxide present. In addition to these soluble copper-containing anions, copper remains in solution as free cupric cation in the range from 2 to 10 ppm. As the cyanide is oxidized to cyanate, the copper-containing complex cyanide anions slowly dissociate to form free cyanide and copper cations once more, so that the persistence of anionic copper-containing complex cyanide ions results in a slow increase in the concentration of cupric cations as the complex anions dissociate due to the aging of the solution. Acceptable levels for the discharge of copper are below 0.009 ppm, so that the persistance of anionic copper-containing complex cyanide ions results in a slow increase in the concentration of cupric cations and cyanide anions as the complex anions dissociate as the solution ages.

The present invention is a novel process which forms insoluble compounds from both the cupricyanide and cuprocyanide anions, as well as the free cupric cation, and provides for the removal of these compounds by precipitation with a third environmentally acceptable compound which is present in quantities in excess over those of the copper-containing complex cyanide anions and cupric cations present.

The first step of the method is the addition of ferric cation in an amount in excess of the stoichiometric amount required to form insoluble ferric compounds of the copper-cyanide anions. Such ferric cuprocyanide and ferric cupricyanide compounds are highly insoluble and will form readily in solution. However, due to the very low concentrations typically encountered in mining and other industrial effluents, usually below 1 ppm, and frequently below 0.5 ppm, the ferric cuprocyanide and ferric cupricyanide compounds will be extremely slow to form particles large enough to precipitate from the solution.

To overcome this problem, at a much higher concentration a second insoluble compound is formed the particles of which rapidly coalesce and precipitate from the solution. Such a second insoluble compound is able to neutralize the electrical repulsive charges which cover the colloidal-sized particles of the highly dilute ferric cuprocyanide and ferric cupricyanide compounds, and thus bring about their precipitation from solution.

Specifically, the second insoluble compound is formed from the excess ferric cation and an environmentally acceptable anion, such as hydroxide, bicarbonate, carbonate, sulfide or hydrosulfide, ammonium or quaternary hydroxide, or any combination of these anions. The anion is chosen so that it will also form an insoluble compound with any remaining cupric cation in the solution, and the complex copper-cyanide anions and free cupric cation are simultaneously and substantially completely removed from the effluent solution.

The ferric cation may be conveniently added as a soluble ferric salt or as a soluble ferrous salt, the ferrous ion being later oxidized to the ferric state. Useful ferric salts include ferric chloride and ferric sulfate. Ferrous sulfate may be added and oxidized in the presence of an oxidizing agent such as hydrogen peroxide, sodium hypochlorite and the like.

The ferric cation should be added in a concentration well in excess of the stoichiometric amount required to react with the cuprocyanide and cupricyanide anions, and the cupric cation if present. Typically the amount will be at least five times the stoichiometric amount, more typically ten times and greater. The concentration of cuprocyanide and cupricyanide anions remaining in the effluent after oxidation of the free cyanide ion with hydrogen peroxide will usually be in the range from 0.1 to 1 ppm, and the added ferric cation concentration will usually be 5 ppm and above.

When adding ferric cation, it is necessary that the pH be maintained below about 5 in order to prevent the immediate formation and precipitation of ferric hydroxide. The immediate precipitation of ferric hydroxide is undesirable as it inhibits the formation of the ferric cuprocyanide and ferric cuprocyanide salts as the ferric hydroxide will be formed substantially immediately upon addition.

After addition of the ferric cation to a stirred and well mixed solution, it is necessary to wait a sufficient period for the formation of the ferric cuprocyanide and cupricyanide salts. Generally, a lower concentration of the cuprocyanide and cupricyanide requires a longer delay before proceeding with the next step. Usually a delay of one minute will be sufficient, with a delay of two to three minutes being preferred to be assured of substantially complete formation of the salts.

After waiting the requisite period, a precipitant is added to cause the excess ferric cation to precipitate. Several precipitants are suitable, with various soluble hydroxides, carbonates, sulfides and hydrosulfides being preferred. Specific precipitants include sodium hydroxide, potassium hydroxide, calcium hydroxide, sodium bicarbonate, sodium carbonate, potassium bicarbonate, potassium carbonate, sodium sulfide, potassium sulfide, calcium sulfide, and analogous compounds of other metals of Groups I and II of the Periodic Table of the elements. Since the precipitant will be added in excess, it is necessary that the precipitant be environmentally acceptable as it will often be discharged directly to the environment.

The preferred method for precipitating the ferric cation is adjusting the pH to about 7 and above, causing the formation of ferric hydroxide. In addition, the remaining free cupric cation forms cupric hydroxide, which is also precipitated. Formation of the insoluble hydroxides occurs substantially immediately, and the precipitates are present at sufficiently high concentrations to form aggregates which will settle out from the effluent if it is allowed to remain still. It will sometimes be desirable to add flocculents to accelerate the formation of the aggregates, although the addition of flocculents is not mandatory.

EXPERIMENTAL RESULTS

The following experiments were performed on cyanidation effluent water having the following average analysis:

|  | ppm |
| --- | --- |
| Total CN | 20.5 |
| Free CN | 2.5 |
| $Cu^{+2}$ | 4.5 |
| $Fe^{+3}$ | 0.65 |
| $Ni^{+2}$ | 0.30 |

In each of the experiments, solutions of ferrous sulfate, ferric sulfate, ferric chloride and hydrogen peroxide were prepared as required and used promptly, to minimize inaccuracies due to decomposition of the solutions on standing. Cyanide and metals analyses were carried out immediately upon completion of each experimental series. Total cyanide values were determined by the standard reflux method, using orthophosphoric acid ($H_3PO_4$) except for Experiments 4, 5 and 6, wherein sulfuric acid was used. Free cyanide values (including free cyanide ion originally present and cyanide ion liberated by the decomposition of unstable or readily dissociable cyanide complexes of metals) were determined by adjusting the pH of the solution to 4.0 by means of acetic acid and sodium acetate, then heating the solution at reflux and distilling the gaseous hydrogen cyanide into a standard base solution in which the hydrogen cyanide was trapped as non-volatile sodium cyanide.

Experiment 1

Effluent water (400 ml) and deionized water (600 ml) were placed in a 1 liter beaker. The pH of the mixture was 7.2, and the temperature was 22° C. Free cyanide ion ($CN^-$ as KCN) was added to give a free cyanide concentration of 4.55 ppm, and a total cyanide concentration of 7.75 ppm. Hydrogen peroxide as added to give a peroxide concentration of 100 ppm, and cupric sulfate was added to give a cupric cation concentration of 10 ppm. The pH of the solution was immediately adjusted to 9.1 (from an initial value of 6.6) by dropwise addition of 0.5 N sodium hydroxide. The solution was very gently stirred for 2 hours, the pH being monitored continuously and maintained between 9.0 and 9.1 throughout the entire peroxide treatment. The final temperature was 23° C., and the solution contained a suspension of finely divided greenish-brown particles.

Ferrous sulfate was then added to give a ferrous cation concentration of 20 ppm, and then hydrogen peroxide was immediately added to give a peroxide concentration of 30 ppm. Superfloc ® 127 (American Cyanamid) was added, and the supernatant solution obtained after 3 minutes was analyzed. The solution was then adjusted to pH 8.0 with saturated calcium hydroxide, allowed to stand unstirred for 30 minutes, then filtered through a double thickness of Whatman No. 42 filter paper (very fine-pore). The filtrate, at pH 7.1 and 23° C., was immediately analyzed. All experiments were carried out in quintuplicate. The results are summarized in Table 1, below. All values are the average for five duplicate analyses.

TABLE 1

| | Analyses(ppm) | | | |
|---|---|---|---|---|
| | Initial | After $FeSO_4$ Addition | After Adjusting pH | % Removal |
| Total CN | 7.75 | — | 0.047 | 99.4 |
| Free CN | 2.05 | — | 0.045 | 97.8 |
| $Cu^{+2}$ | 2.00 | 11.6 | <0.02 | >99.8 |
| $Fe^{+3}$ | 0.33 | 8.16 | <0.02 | >99.9 |
| $Ni^{+2}$ | 0.20 | 0.16 | <0.05 | >75.0 |

Experiment 2

Effluent water (400 ml) and deionized water (600 ml) were placed in a 1 liter beaker. The pH of the mixture was 7.3, and the temperature was 23° C. Free cyanide ($CN^-$ as KCN) was added to give a free cyanide concentration of 4.55 ppm, and a total cyanide concentration of 7.75 ppm. Hydrogen peroxide was added to give a peroxide concentration of 100 ppm. Cupric sulfate was added to give a cupric cation concentration of 10 ppm. The pH was immediately adjusted to 9.1 (from 6.6) by the addition of 0.5 N sodium hydroxide. The solution was very gently stirred for 2 hours, with continuous monitoring of the pH to maintain it at 9.1. The final temperature was 24° C., and the solution contained a suspension of finely divided greenish-brown particles.

Ferric chloride was then added to give a ferric cation concentration of 20 ppm. The pH fell to 4.2. Superfloc ® 127 was immediately added; and, after 3 minutes, the supernatant solution was decanted and analyzed. The pH of the mixture was adjusted to 8.0 by the addition of a saturated solution of calcium hydroxide, then allowed to remain, unstirred, for 30 minutes before filtering through a double layer of Whatman No. 42 filter paper. The filtrate, of pH 7.3 at 24° C., was immediately analyzed. Experiments were conducted in quintuplicate. The average results are given in Table 2.

TABLE 2

| | Analyses(ppm) | | | |
|---|---|---|---|---|
| | Initial | After $FeCl_3$ Addition | After pH Adjustment | % Removal |
| Total CN | 7.75 | — | 0.074 | 99.1 |
| Free CN | 2.05 | — | <0.02 | >99.0 |
| $Cu^{+2}$ | 2.00 | 11.2 | <0.02 | >99.8 |
| $Fe^{+3}$ | 0.33 | 8.1 | <0.02 | >99.9 |
| $Ni^{+2}$ | 0.20 | 0.12 | <0.05 | >75 |

Experiment 3

Effluent water (400 ml) and deionized water (600 ml) were placed in a 1 liter beaker. The pH of the mixture was 7.2 and the temperature was 23° C. Free cyanide ($CN^-$ as KCN) was added to give a free cyanide concentration of 4.55 ppm and a total cyanide concentration of 7.75 ppm. Hydrogen peroxide was added to give a peroxide concentration of 100 ppm and cupric sulfate was added to give a cupric cation concentration of 10 ppm. The pH of the solution was adjusted to 9.1 (from an initial value of 6.6) by dropwise addition of 0.5 N sodium hydroxide. The solution was very gently stirred for 2 hours, the pH being monitored continuously and maintained between 9.0 and 9.1. The final temperature was 24° C. Ferric sulfate was then added to give a ferric cation concentration of 20 ppm, and Superfloc ® 127 was also added. After standing unstirred for 3 minutes, the supernatant solution was decanted and analyzed. The remaining solution was adjusted to pH 8.0, by the addition of saturated calcium hydroxide, then allowed to remain, unstirred, for 30 minutes before filtering through a double layer of Whatman No. 42 filter paper. The filtrate of pH 7.4, at 23° C., was immediately analyzed, and the results are summarized in Table 3. All values are the average for five duplicate analyses. All experiments were carried out in quintuplicate.

TABLE 3

| | Analyses(ppm) | | | |
|---|---|---|---|---|
| | Initial | After $Fe_2(SO_4)_3$ Addition | After pH Adjustment | % Removal |
| Total CN | 7.75 | — | 0.072 | 99.1 |
| Free CN | 2.05 | — | 0.034 | 98.3 |
| $Cu^{+2}$ | 2.00 | 11.4 | 0.05 | 99.6 |
| $Fe^{+3}$ | 0.33 | 8.6 | <0.02 | >99.9 |
| $Ni^{+2}$ | 0.20 | 0.13 | <0.05 | >75.0 |

Experiment 4

Effluent water (1 liter), pH 7.1 at 22° C., was "spiked" with 10 ppm cyanide ion ($CN^-$ as KCN) to give a free cyanide concentration of 14.23 ppm. Hydrogen peroxide was then added to give a peroxide concentration of 100 ppm and cupric sulfate was added to give a cupric cation concentration of 10 ppm. The pH of the solution was immediately adjusted to 9.1 (from an initial value of 6.4) by the dropwise addition of 0.5 N sodium hydroxide. The solution was very gently stirred for 2 hours, the pH being monitored continuously and maintained between 9.0 and 9.1 throughout the entire 2-hour peroxide/copper treatment. The final temperature was 23° C., and the solution contained a suspension of finely divided greenish-brown particles.

Ferrous sulfate was then added to give a ferrous cation concentration of 20 ppm. Hydrogen peroxide was immediately added to give a peroxide concentration of 30 ppm. Superfloc ® 127 was added and the solution adjusted to pH 7.0 by the addition of saturated calcium hydroxide. The mixture was allowed to stand, unstirred, for 30 minutes, then filtered through a double layer of Whatman No. 42 filter paper. The filtrate was immediately analyzed. Experiments were carried out in triplicate. The average results are given in Table 4.

TABLE 4

|  | Analyses(ppm) | | |
| --- | --- | --- | --- |
|  | Initial | After pH Adjustment | % Removal |
| Free CN | 14.25 | 2.4 | 83.2 |
| $Cu^{+2}$ | 4.68 | 1.3 | 91.1 |
| $Fe^{+3}$ | 1.4 | <0.02 | 100.0 |
| $Ni^{+2}$ | 0.3 | <0.05 | <83.3 |

Experiment 5

To effluent water treated with hydrogen peroxide, cupric sulfate and sodium hydroxide as in Experiment 4 was added ferric chloride to a ferric cation concentration of 0.20 ppm. After adding Superfloc ® 127, the pH was adjusted to 7.0 by the addition of calcium hydroxide. The mixture was allowed to stand unstirred for 30 minutes then filtered through a double layer of Whatman No. 42 filter paper. The filtrate was immediately analyzed (in triplicate) and the average results are given in Table 5.

TABLE 5

|  | Analyses(ppm) | | |
| --- | --- | --- | --- |
|  | Initial | After pH Adjustment | % Removal |
| Free CN | 14.25 | 2.5 | 82.5 |
| $Cu^{+2}$ | 4.68 | 2.07 | 85.9 |
| $Fe^{+3}$ | 1.4 | <0.02 | 100.0 |
| $Ni^{+2}$ | 0.3 | 0.21 | 30 |

Experiment 6

To effluent water treated as in Experiments 4 and 5 was added ferric sulfate to a final ferric cation concentration of 20 ppm. After addition of Superfloc ® 127, the pH was adjusted to 7.0. The mixture was allowed to stand unstirred for 30 minutes then it was filtered through a double layer of Whatman No. 42 filter paper. The filtrate was immediately analyzed (in triplicate) and the average results are summarized in Table 6.

TABLE 6

|  | Analyses (ppm) | | |
| --- | --- | --- | --- |
|  | Initial | After pH Adjustment | % Removal |
| Free CN | 14.25 | 2.17 | 84.8 |
| $Cu^{+2}$ | 4.68 | 2.1 | 85.7 |
| $Fe^{+3}$ | 1.4 | <0.2 | 100.0 |
| $Ni^{+2}$ | 0.3 | 0.15 | 50 |

The results of the experiments are summarized in Table 7.

TABLE 7

| Precipitating Reagent | Percent Free CN Removed | Percent $Cu^{+2}$ Removed | Percent $Fe^{+2}$ Removed | Percent $Ni^{+2}$ Removed |
| --- | --- | --- | --- | --- |
| $FeSO_4/H_2O_2$ | 97.8 | >99.8 | 100.0 | 75.0 |
| $FeCl_3$ | 99.0 | >99.8 | 100.0 | 75.0 |
| $Fe_2(SO_4)_3$ | 98.3 | 99.6 | 100.0 | 75.0 |

These data indicate that soluble copper in the form of free cupric cation and cupricyanide and cuprocyanide anions may be removed from wastewater to levels of 0.02 ppm and below (0.02 ppm is the lower limit for the accurate determination of copper by the atomic absorption spectrophotometer employed in this study) by a two-step method wherein the wastewater is first treated with excess ferric ion and after a predetermined period, the pH is adjusted to about 8 to precipitate substantially all soluble copper present.

Although the foregoing invention has been described in some detail by way of illustration and example for purposes of clarity of understanding, it will be obvious that certain changes and modifications may be practiced within the scope of the appended claims.

What is claimed is:

1. A method for removing residual copper from cyanide-containing wastewater wherein the copper exists at least in part as cuprocyanide and cupricyanide anions, said method comprising:
   adding ferric cation to the water in an amount equal to at least five times the stoichiometric amount required to form the ferric salts of the cuprocyanide and cupricyanide anions while maintaining the pH of the wastewater below about 5; and
   after waiting at least one minute to allow sufficient time for said ferric cuprocyanide and ferric cupricyanide salts to form, adding a soluble precipitant which reacts to precipitate substantially all of the remaining excess ferric cation as well as the free cupric cation, whereby the ferric cuprocyanide and cupricyanide are removed by co-precipitation.

2. In a process for removing cyanide from wastewater, said method involving the addition of a soluble cupric compound which results in the formation of residual cupric cation and copper-cyanide anionic complexes, a method for removing said residual cupric cation and copper-cyanide anionic complexes, said method comprising:
   adding ferric cation to the water in an amount equal to at least five times the stoichiometric amount required to form the ferric salts of the cuprocyanide and cupricyanide anions while maintaining the pH of the wastewater below about 5; and
   after waiting at least one minute to allow sufficient time for said ferric cuprocyanide and ferric cupricyanide salts to form, adding a soluble precipitant which reacts to precipitate substantially all of the remaining excess ferric cation as well as the free cupric cation, whereby the ferric cuprocyanide and cupricyanide are removed by co-precipitation.

3. A method for treating wastewater to remove free cyanide, said method comprising:
   oxidizing the cyanide ion in the presence of cupric cation to cyanate ion, said oxidation leaving a residual level of soluble cationic copper and anionic copper-cyanide complexes;
   adding ferric cation to the water in an amount equal to at least five times the stoichiometric amount required to form the ferric salts of the cuprocyanide and cupricyanide anions while maintaining the pH of the water below about 5; and after waiting at least one minute to allow sufficient time for said ferric cuprocyanide and ferric cupricyanide salts to form, adding a soluble precipitant which reacts to precipitate substantially all of the remaining excess ferric cation, as well as the free cupric cation, whereby the ferric cuprocyanide and cupricyanide are removed by co-precipitation.

4. A method as in claims 1, 2 or 3, wherein the ferric cation is added as ferrous cation which is substantially immediately oxidized to the ferric state.

5. A method as in claims 1, 2 or 3, wherein the ferric cation is added as an environmentally acceptable, soluble ferric salt.

6. A method as in claim 5, wherein the ferric salt is selected from the group comprising ferric chloride and ferric sulfate, or a mixture thereof.

7. A method as in claims 1, 2 or 3, wherein the precipitant is added in at least five times the stoichiometric amount.

8. A method as in claims 1, 2 or 3, wherein the precipitant is selected from the group comprising sodium hydroxide, potassium hydroxide, calcium hydroxide, sodium bicarbonate, sodium carbonate, potassium bicarbonate, potassium carbonate, sodium sulfide, potassium sulfide, calcium sulfide, and analogous compounds of other metals of Groups I and II of the Periodic Table of the elements.

9. A method for removing residual copper from cyanide-containing water wherein the copper exists at least in part as a cupric cation and a copper-cyanide anionic complex, said method comprising:

adding ferric cation to the water in a concentration of at least 5 ppm while maintaining the pH below about 5 to form insoluble ferric cuprocyanide and ferric cupricyanide salts; and after waiting at least one minute to allow sufficient time for the insoluble salts to form, adjusting the pH of the water to above about 7 to precipitate the excess ferric cation as ferric hydroxide which acts to remove the insoluble cuprocyanide and cupricyanide salts by co-precipitation.

10. A method as in claim 9, wherein the ferric cation is added as ferrous cation and oxidized to the ferric state in solution.

11. A method as in claim 9, wherein the pH is adjusted to above about 7 by the addition of sodium hydroxide, calcium hydroxide, potassium hydroxide, or the hydroxides of metals of Groups I and II of the Periodic Table of the elements, or with ammonium hydroxide or quaternary ammonium hydroxides.

* * * * *